Jan. 5, 1926.
A. W. LAWSON
1,568,855
PASSENGER COMPARTMENT
Filed April 21, 1925
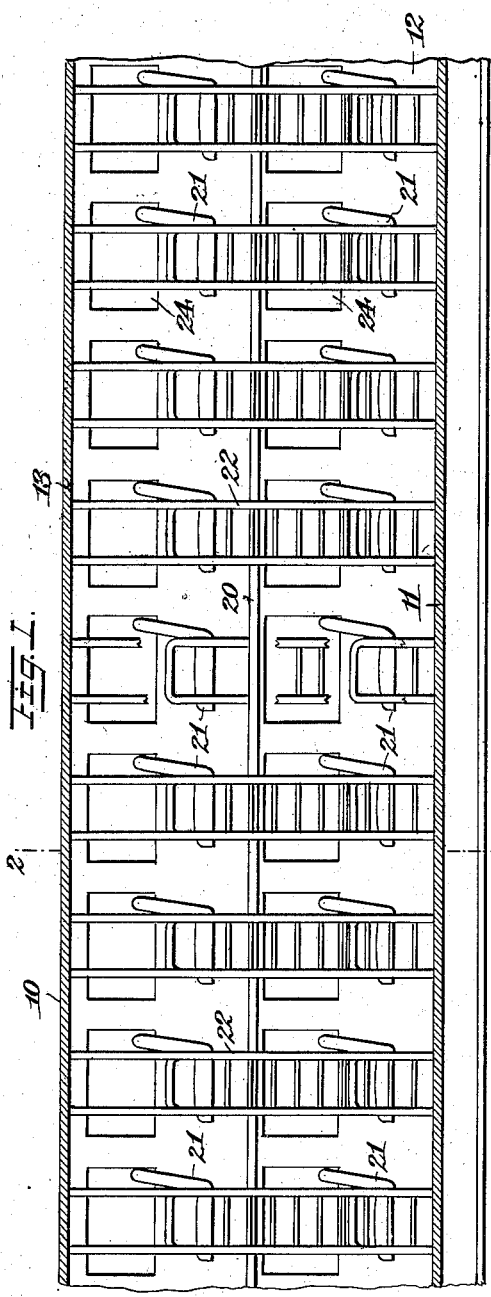
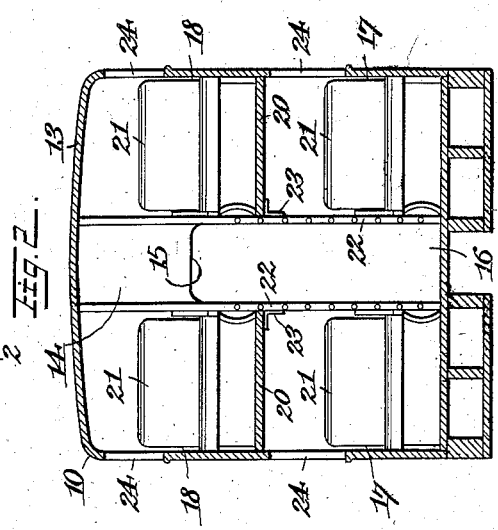
WITNESSES
INVENTOR,
Alfred W. Lawson.
BY
ATTORNEYS Patented Jan. 5, 1926.

1,568,855

UNITED STATES PATENT OFFICE.

ALFRED W. LAWSON, OF NEW YORK, N. Y.

PASSENGER COMPARTMENT.

Application filed April 21, 1925. Serial No. 24,848.

*To all whom it may concern:*

Be it known that I, ALFRED W. LAWSON, a citizen of the United States, and a resident of the city of New York, borough of Manhattan, in the county and State of New York, have invented new and useful Improvements in Passenger Compartments, of which the following is a full, clear, and exact description.

This invention relates to passenger compartments and has especial reference to passenger compartments of public conveyances, carriers, or vehicles.

The primary object of the present invention is to maximize the seating capacity of a passenger compartment by utilizing all possible space ordinarily wasted.

Another object of the invention is to double the seating capacity of a passenger compartment of standard type by bounding a central passageway by tiers of seats in a manner so that the greatest possible number of passengers may be seated, means also being provided permitting ingress to the seats from the passageway and egress from the seats to the passageway.

With the foregoing, other objects of the present invention will appear when the following specification is read in conjunction with the accompanying drawing, in which:

Figure 1 is a central longitudinal sectional view through a passenger car or compartment, a portion of which is shown to illustrate the relative disposition of the seats at one side of the car or compartment;

Fig. 2 is a transverse sectional view taken on the line 2—2 of Fig. 1, and illustrating the transverse relative disposition of the seats of the car or compartment.

As stated, the present invention contemplates maximizing the seating capacity of a passenger comparatment by utilizing all possible space, and, at the same time, making provision for the convenient ingress to and egress from the seats.

The present embodiment of the invention is by way of example only, and is not to be considered as limited to the particular type of compartment shown—of the railroad car type—since passenger compartments of aircraft, marine-craft, and others, may have the seating arrangement of the present invention incorporated therein.

Referring now more particularly to the views of the drawing, it will be apparent that the passenger compartment 10 is conventionally illustrated and is of the standard railroad car type, and will have besides the floor 11, sides 12, top 13, and a wall, such as the wall 14, at each end, each end wall 14 to have a doorway 15. Extending longitudinally of the compartment 10 from the floor 11 to the top 13, throughout the length of the car, in communication with each doorway 15, is a passageway 16. The passageway 16 is bounded by tiers of seats 17 and 18. The tiers of seats 17 constitute the lower seats and the tiers of seats 18 constitute the upper seats. The lower tiers of seats 17 are supported by the floor 11, whereas the upper tiers of seats 18 are supported by platforms 20 arranged substantially midway of the floor 11 and top 13. Each of the seats 21 may be of any preferred type. In order that the seats of the upper tiers may be convenient to passengers, there is provided, in the present instance, ladders 22. One ladder 22 is arranged adjacent a seat of the lower tier and a seat of the upper tier throughout. By referring to Fig. 1, it will be seen that the seats 21 of the upper tiers are arranged, respectively, in alinement over the seats 21 of the lower tiers, and that there is sufficient space between the seats and the ladders 22, to permit passengers to have access to the seats of the lower tiers and also to the seats of the upper tiers. Access is had to the seats of the upper tiers by ascending their related ladders. The ladders at one side of the passageway 16, aside from providing means for giving access to the upper tier of seats, give support to the platform 20, as at 23, connection being made between the platform and the side rails of the ladders, said side rails also extending from the floor 11 to the top 13 to give additional rigidity. Adjacent each of the seats 21, the sides 12 are provided with suitable windows 24.

Within the scheme of the present invention and according to the arrangement of the tiers of seats with respect to the passageway, it will be understood that passengers may stand erect in the passageway 16, and since when seated, the passengers do not require the same amount of head room or space as when standing, it is sufficient to provide only so much space from the floor as will allow a person of average stature to be seated with enough head room. Therefore, the platforms 20 are arranged substantially midway of the floor 11 and the top 13, and for that reason it is possible to put into the compartment the additional upper tiers 18, thereby doubling the capacity of the compartment 10 without sacrificing any of the conveniences or comforts which passengers ordinarily have in a standard type of car or compartment of standard dimensions.

From the foregoing it will be understood that the seating capacity is maximized by arranging or bounding a passageway with tiers of seats as shown, without in any way depriving passengers of the conveniences which they now have.

What is claimed is:

1. A passenger compartment having a passageway, and tiers of seats at opposite sides of said passageway, said passageway being common to all of said seats and all of said seats being directly accessible from said passageway.

2. A passenger compartment having a passageway, and tiers of seats at opposite sides of said passageway, said seats being arranged transversely with respect to said compartment and passageway.

3. A passenger compartment having a passageway, upper and lower tiers of seats at opposite sides of said passageway, said seats being arranged transversely with respect to said compartment and passageway, and means in the form of ladders by virtue of which access is had to the upper tiers of seats.

4. A vehicle body or compartment for seating passengers, having a floor, side walls, and a roof, a lower and an upper tier of seats adjacent each side wall, there being a passageway between the lower and upper tiers of seats at one side and those at the opposite side, said passageway extending the length of the body or compartment and from the floor to the roof.

5. A vehicle compartment arrangement for seating passengers, consisting of a passageway extending the length of the compartment and bounded by upper and lower tiers of seats, and means affording ingress to the upper tiers of seats from the passageway and affording egress from the upper tiers of seats to said passageway.

ALFRED W. LAWSON.